United States Patent [19]

Goettl

[11] 4,098,260
[45] Jul. 4, 1978

[54] SOLAR HEAT COLLECTOR AND RADIATOR FOR BUILDING ROOF

[76] Inventor: William H. Goettl, 2005 E. Indian School, Phoenix, Ariz. 85018

[21] Appl. No.: 766,087

[22] Filed: Feb. 7, 1977

[51] Int. Cl.² .............................................. F24J 3/02
[52] U.S. Cl. ................................... 126/270; 237/1 A
[58] Field of Search ............... 126/270, 271; 237/1 A; 47/17; 98/31; 52/616, 618; 165/48

[56] References Cited

U.S. PATENT DOCUMENTS

| 1,742,861 | 1/1930 | Johnson | 126/271 |
| 3,902,474 | 9/1975 | Pyle | 126/271 |
| 3,991,937 | 11/1976 | Heilemann | 237/1 A |
| 4,010,733 | 3/1977 | Moore | 126/271 |
| 4,020,989 | 5/1977 | Kautz | 237/1 A |

Primary Examiner—Kenneth W. Sprague
Assistant Examiner—James C. Yeung

Attorney, Agent, or Firm—John A. Robertson; Don J. Flickinger

[57] ABSTRACT

The disclosure relates to a heat collecting and heat radiating roof structure for use in collecting solar energy and/or for use in radiating unwanted heat to the far sky; the disclosure relating specifically to a roof construction having rafters and duct means intermediate the rafters with return and delivery channels or passages through which air may be circulated to collect heat from the sun's rays, which may be absorbed by the roof structure, or to reject heat at night to the far sky if desired; the disclosure relating to novel construction of duct means between roof rafters; the duct means being made of sheet metal and having upwardly extending portions covered by an inverted U-shaped structure located directly above each rafter. The disclosure also relates to a radiation transparent convection and dust shield means disposed over the heat collecting ducts of the roof structure.

9 Claims, 6 Drawing Figures

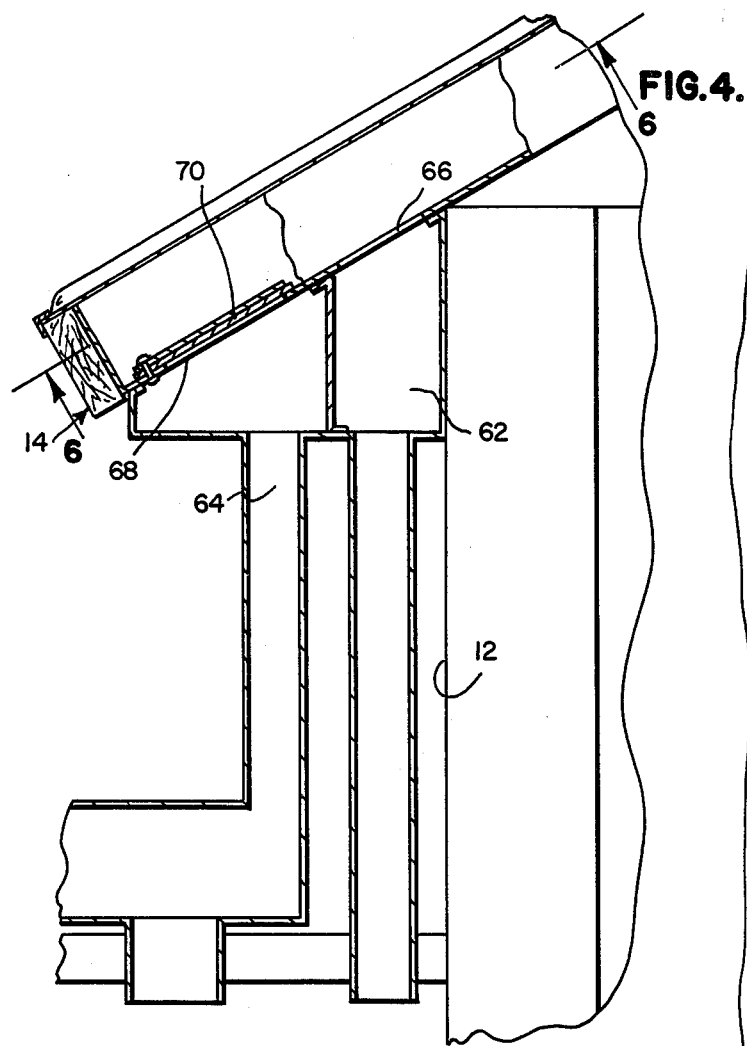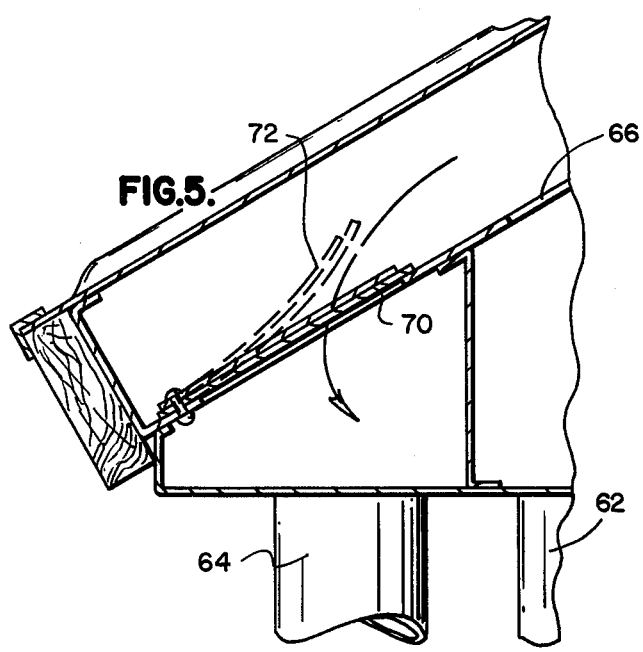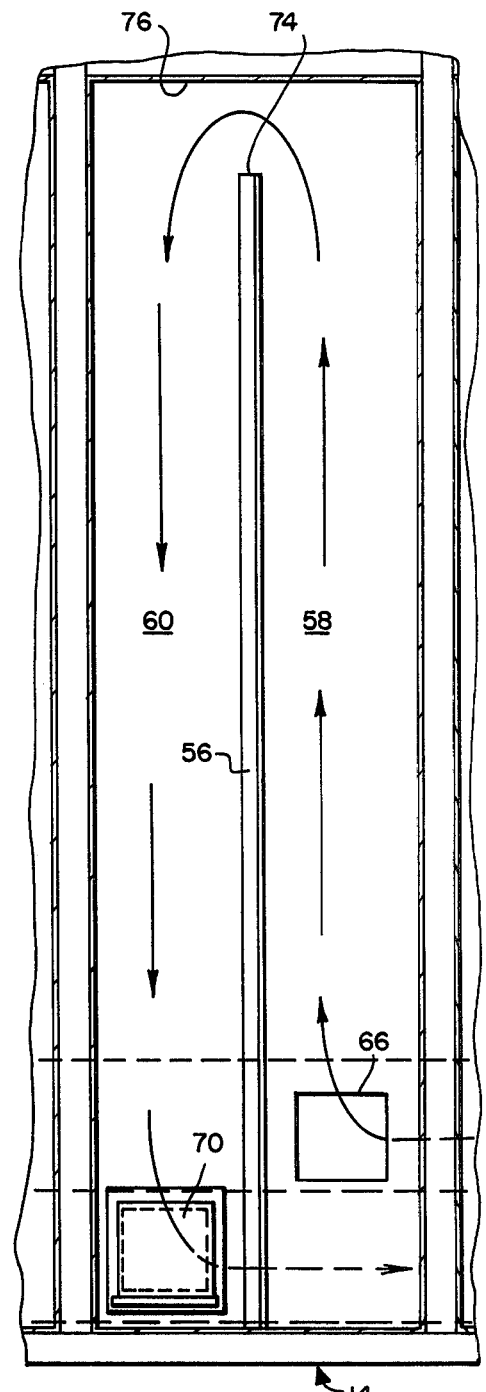

SOLAR HEAT COLLECTOR AND RADIATOR FOR BUILDING ROOF

BACKGROUND OF THE INVENTION

Various heat collectors, such as pipes, have been disposed on building roofs to collect heat for heating water or the like, and it has been recognized that in some areas a substantial amount of solar heat may be collected by a roof structure for the purpose of heating the interior of a building and also, it has been recognized that heat radiating means of a roof structure may be used for rejecting heat to the far sky at night for cooling a building.

SUMMARY OF THE INVENTION

The invention relates to a novel heat collecting and heat radiating roof structure wherein duct means is disposed between building rafters and the building rafters are covered by portions of the duct means which serves as a water proof roof surface above the rafters and also, as a heat collecting or heat radiating structure on the top of a building. Specifically, the structure of the heat collecting and radiating roof structure involves generally parallel spaced apart rafters with duct means therebetween; the duct means comprising one generally U-shaped in cross section member having an intermediate portion and upstanding flanges provided with horizontal portions spaced from the intermediate portion and the horizontal portions extending over portions of the upper areas of rafters and the horizontal portions being further provided with upwardly disposed portions. Additionally, cover plate structure is disposed over the U-shaped channel shaped duct members and is also provided with upwardly directed portions and an inverted U-shaped in cross section cover member is disposed over said last mentioned upwardly extending portions in straddling relationship therewith to connect them together and to seal them against the entrance of water. The invention also comprises a radiation transparent convection shield above the aforementioned cover plate to prevent loss of heat therefrom due to convection by air movement thereover.

Each duct structure between adjacent rafters is provided with an intermediate partition between the intermediate portion of the channel shaped structure and the cover plate; the partition being adapted to define delivery duct and return duct passages; the duct members between the rafters having first and second ends; the partition being spaced from the first end so as to permit flow to pass from the return duct to the delivery duct and to traverse the entire area of the duct means for collecting heat therefrom and the second ends of the duct structures extending along with the rafters over the eaves to the outside of the building wall and return and delivery duct means is connected to the return and delivery duct portions of the duct structure between the rafters. Accordingly, air moving means, such as a blower or the like, is adapted to force air into the return duct structure and remove it from the delivery duct structure so that heat may be collected from the delivery duct structure, or if the roof structure is being used to reject heat, the hot air is forced through the return and delivery duct structure, thereby heating this duct structure and radiating the heat to the far sky. In many instances on a clear night, the far sky comprises a heat sink which is approximately minus 50° Farenheit and, accordingly, a building roof structure may radiate a very substantial amount of heat with a differential between 100° in the building and minus 50° at the far sky. Additionally, the roof structure may collect a substantial amount of heat for heating a building when intense sunshine on the roof heats the metallic duct structure, which is readily exposed between the roof rafters. Convective air flow through the duct structure also carries heat away from the ceiling of a building thereby insulating it from intense solar radiation.

A simple thermoplastic means is provided in accordance with the present invention to control flow through the return and delivery duct means, aforementioned, and thus, provide for efficient operation thereof.

Accordingly, it is an object of the present invention to provide a very efficient heat collecting and heat radiating roof structure for building wherein the roof structure is provided with rafters between which the heat collecting and radiating ducts are disposed and which form an integral part of the roof structure and which also provide protection against the elements.

Another object of the invention is to provide a relatively economical heat collecting and heat radiating roof structure for buildings, which is adapted not only to serve efficiently as a roof, but also to collect solar heat and to reject heat at night to the far sky so that heating may be accomplished in the daytime during the winter and cooling may be accomplished at night during the summer.

Another object of the invention is to provide a novel channel and cover plate structure which fits between rafters on the roof and which is provided with upstanding flanges which meet over median portions of the rafters and the upstanding flange portions are covered by an inverted U-shaped metal structure providing a very simple, efficient and weather tight means for construction of the heat collecting and heat radiating roof structure of the invention.

Another object is to provide a heat collecting roof structure as hereinbefore described wherein a radiation transparent shield is provided above the heat collector to prevent convection losses due to air movement over the roof.

Another object of the invention is to provide a novel heat collecting and heat radiating roof structure having rafters between which duct means is supported and the duct means being exposed to the sky and provided with return and delivery ducts which communicate with each other such that air may be circulated through the ducts from a position near the eaves of the building to a position near the gable thereof and then returned to a position near the eaves for carrying heat to a building room.

Another object of the invention is to utilize the heat collecting and heat radiating roof structure of the invention in an efficient manner to cool a building room at night during the summertime.

Another object of the invention is to provide a novel heat collecting and heat radiating roof structure having simple means for thermostatically controlling the flow of air therethrough and for maintaining efficient operation thereof.

Further objects and advantages of the invention may be apparent from the following specification, appended claims and accompanying drawings.

BRIEF DESCRIPTION OF THE DRAWINGS

FIG. 4 is an enlarged fragmentary sectional view taken from the line 4—4 of FIG. 1 showing return and delivery duct means connected with the respective return delivery passages in the heat collecting and heat radiating roof structure of the invention;

FIG. 5 is an enlarged fragmentary sectional view of thermostatic control means intercommunicating with the roof duct structure and the delivery duct means of the invention; and FIG. 6 is a fragmentary sectional view taken from the line 6—6 of FIG. 4.

DESCRIPTION OF THE PREFERRED EMBODIMENTS

Figure 1:
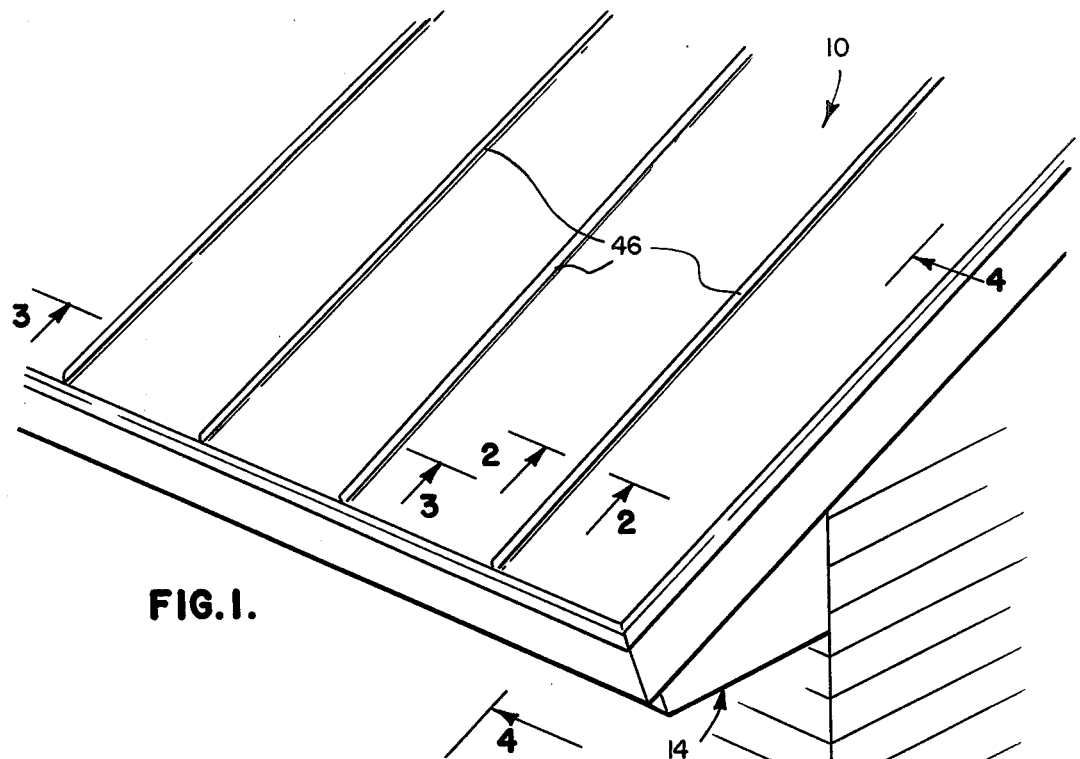
FIG. 1 is a fragmentary perspective view of a heat collecting and heat radiating roof structure of the invention shown on a portion of a building.

In accordance with the invention, a roof structure 10 is supported on a conventional building wall structure 12 and the roof structure 10 is provided with eaves 14 overhanging the wall structure 12 substantially in the conventional manner; the roof structure 10 being inclined relative to the walls 12 and having a plurality of rafters 16 which extend in substantially parallel spaced apart relationship to each other on an incline from the eaves 14 to the conventional gable of the building roof. These rafters are provided with substantially vertical upwardly and downwardly extending surfaces 18 adjacent to which normally vertical flanges 20 of U-shaped duct structure 22 are disposed. These flanges 20 may be slightly spaced from the surfaces 18 of the rafters 16 to compensate for irregularities in the spacing of the rafters or their structural features.

The channel shaped duct structure 22 is provided with an intermediate portion 24 with which the flange portions 20 are integral; these flange portions 20 being upwardly directed flange portions adjacent the sides 18 of the rafters 16 and integral with the flange portions 20 are horizontal flange portions 26 and 28. The generally horizontal flange portion 26 is generally parallel with the intermediate portion 24 of the duct structure 22 and spaced upwardly therefrom. The flange portion 26 is provided with an upwardly extending or generally vertical portion 30 shown best in FIG. 2 of the drawings on enlarged scale. A nail 32 is disposed in an opening 34 in the generally horizontal flange portion 26 and is driven into the upper portion 36 of the rafter 16.

Figure 3:
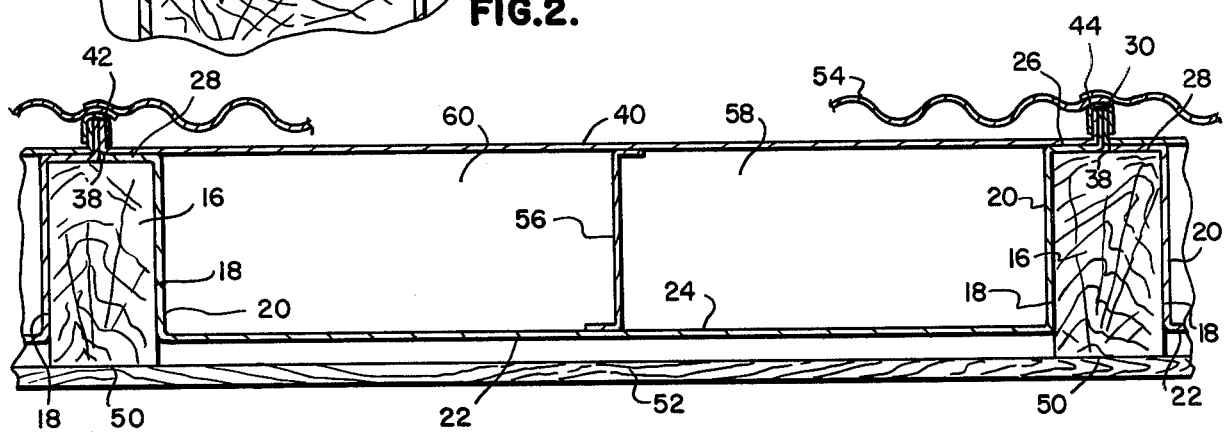
FIG. 3 is an enlarged fragmentary sectional view taken from the line 3—3 of FIG. 1, showing additionally a radiation transparent convection and dust shield for the heat collecting and radiating duct structures of the invention.

The horizontal flange portion 28, as shown in FIG. 3, terminates at 38, and is not provided with the upwardly extending portion 30 as is the horizontal flange portion 26. However, it may be provided with an upwardly extending flange portion similar to the flange portion 30 if desired.

Primarily, the terminus at the edge 38 of the horizontal portion 28 provides for flexibility in the installation of the duct means relative to rafters which may be spaced slightly in variance with a conventional modular spacing. This may be due to structural differences in the rafters, such as the usual wooden rafters may vary in thickness or may not be exactly straight. Accordingly, the terminus 38 provides some flexibility in the installation of the duct members 22 between the rafters 16.

It will be seen that the upstanding portion 30 or upwardly extending portion 30, which is integral with the horizontal flange portion 26, is disposed near a middle of intermediate portion of the upper edge 36 of the respective rafter 16 and that the terminus 38 of the horizontal flange portion 36 may be spaced from the upwardly directed portion 30 of the horizontal flange portion 26.

A heat collecting or heat radiating cover plate 40 is disposed over each channel shaped duct member 22 and the cover plate 40 is provided with opposite edges terminating in upwardly extending portions 42 and 44 which are disposed at opposite sides of the upwardly extending portion 30 of the horizontal flange 26 hereinbefore described.

An inverted U-shaped in cross section channel member 46 is disposed over the upwardly extending portions, 30, 42 and 44 and this inverted U-shaped channel 46 connects the upwardly extending portions 30, 42 and 44 together and prevents water from gaining access to areas between these upwardly extending portions so as to seal the joinders of the cover plates 40 together with the upwardly extending portions 30 of the horizontal flange portion 26.

Figure 2:
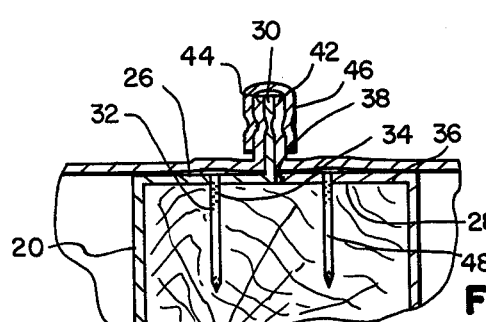
FIG. 2 is an enlarged fragmentary sectional view taken from the line 2—2 of FIG. 1.

As shown in FIG. 2 of the drawings, a nail 48 similar to the nail 32 is disposed in the upper portion 36 of the rafter 16 and holds the horizontal flange portion 28 securely on the upper portion 36 of the rafter 16.

Secured to lower portions 50 of the rafter 16 is a ceiling or finish layer of material such as insulation or the like; this insulation or finish layer being designated 52 in FIG. 3.

A radiation transparent convection and dust shield 54 is disposed in spaced relation with the heat collecting cover plate 40 to prevent dust from collecting thereon and to provide a means which may be cleaned readily to remove dust therefrom; the radiation transparent member 54 is also and particularly arranged to prevent convective cooling of the upper surface of the cover 44 so that breeze may not carry away heat collected on the cover plate 40.

The terms "radiation transparent" are intended to define material such as resin bonded fiberglass or equivalent material which will pass radiant heat from the sun to the heat collecting or heat radiating cover plate 40.

Disposed in an intermediate portion between the flanges 20 of the duct member 22 is a partition member 56 dividing the duct member 22 into two passages; namely, return duct 58 and a delivery duct 60, which are shown in FIG. 6 of the drawings. The return duct 58 receives air through a return duct means 62 and the delivery duct 60 delivers air into a delivery duct means 64.

The intermediate portion 24 of each respective channel shaped or U-shaped duct 22 is provided with an opening 66 intercommunicating with the return duct 58 and the respective duct means 62 and the intermediate portion 24 of each U-shaped or channel shaped duct 22 is provided with a delivery opening 68 intercommunicating with the respective delivery passage and the delivery duct means 64.

A bimetal thermostatically operated flapper valve 70 is disposed to deflect into a broken line position 72 shown in FIG. 5 of automatically controlling the flow of air through the passages 58 and 60 in accordance with the termperature thereof.

It will be seen tha the duct means 62 and 64 is beyond the wall structure 12 and inwardly relative to the eaves 14. The partition 56 which separates the ducts 58 and 60 extends generally from the eaves 14 to a position 74, which is the upper terminus of the partition 56 and it is spaced from the upper end 76 of the duct 22 so as to provide a flow path around the end of the partition 74 so that air must pass all the way up the return passage 58 and around the end 74 of the partition 56 and then downwardly through the delivery passage 60 and outwardly through the thermostatically controlled valve 70 and to a used location through the duct means 64.

It will be appreciated that air flowing through the ducts 58 and 60 may carry heat from the interior of the building surrounded by walls 12 and may radiate this heat by means of the cover plate 40 to the far sky at night in the summertime and the air passing through the ducts 58 and 60 may collect heat from the cover plate 40 during the daytime in the winter so that rooms internally of the building surrounded by walls 12 may be heated by solar energy.

The channel members 22 and cover plate 40, together with the inverted U-shaped in cross section members 46, provide a roof structure in combination with conventional wooden rafters 16, which serve very efficiently from a structural standpoint as well as a utility standpoint and thereby provides a very substantial roof which also has the heat collecting and heat radiating capabilities hereinbefore described.

The radiation transparent convection and dust shield 54 provides a shield for the cover plate 40 so that wind cannot convectively exchange heat from the cover plate 40 and whereby this plate 40 may collect heat even though there is a slight breeze in the atmosphere.

It will be obvious to those skilled in the art that various modifications may be resorted to without departing from the spirit of the invention.

I claim:

1. A heat collecting and heat radiating roof structure having a plurality of spaced apart substantially parallel rafters; said rafters having upper and lower portions and first and second substantially upward and downwardly extending opposite sides; substantially U-shaped duct members disposed between adjacent ones of said rafters; said duct members each having an intermediate portion substantially spanning the distance between said rafters; said duct members each having a pair of flange portions extending upwardly from said intermediate portion adjacent respective upward and downwardly extending sides of respective rafters; each flange portion having a generally horizontal portion overlying approximately half of said upper portion of a respective rafter; said generally horizontal portion being disposed above said intermediate portion; a first upwardly extending portion extending upwardly from each respective horizontal portion of each respective flange; said first upwardly extending portion being located in an intermediate area over said upper portion of a respective one of said rafters; a duct cover plate positioned over one of said horizontal portions of one of said flanges; said cover plate having a second upwardly extending portion adjacent said first upwardly extending portion; a second duct cover plate having a third upwardly extending portion adjacent said first upwardly extending portion; said second duct cover plate extending in a direction opposite to said first duct cover plate with respect to said first upwardly extending portion; and an inverted U-shaped in cross section cover member positioned over and covering said first, second and third upstanding portions.

2. The invention as defined in claim 1, wherein: said duct members, said cover plates and said cover members being made of sheet metal.

3. The invention as defined in claim 1, wherein: each of said duct members is provided with said first generally upwardly extending portion at only one of said generally horizontal portions.

4. The invention as defined in claim 1, wherein: a partition member is disposed between said pair of flange portions to define a delivery duct at one side of said partition; and a return duct at the opposite side thereof; the respective duct members having first and second ends; said partition members spaced from said first ends to define a flow path from said return duct to said delivery duct at said first end; return duct inlet means communicating with said return duct adjacent said second end; and delivery duct outlet means communicating with said delivery duct adjacent said second end.

5. The invention as defined in claim 4, wherein: thermostatically responsive means is disposed for controlling air flow through said return and delivery ducts.

6. The invention as defined in claim 4, wherein: insulation means is disposed at said lower portions of said rafters.

7. The invention as defined in claim 1, wherein: radiation transparent convection and dust shield means is disposed above said cover plates.

8. In a heat collecting and heat radiator roof structure for a building; a vertical wall, an inclined roof structure supported by said wall and including a portion extending beyond said wall to the exterior of said wall with eaves depending from said portion of the roof on the exterior of said wall, a plurality of generally parallel adjacent heat conducting ducts, said ducts having first and second ends, one of said ducts connecting with another of said ducts at said first ends, a delivery duct connected with said one of said heat conducting ducts adjacent said second end, and a return duct connecting with another one of said heat conducting ducts adjacent said second ends, said delivery and return ducts being disposed on the exterior of said wall and means extending through said eaves for connecting said delivery and return ducts at their upper ends with the heat conducting ducts.

9. The invention as defined in claim 8, wherein: radiation transparent convection and dust shield means is disposed in spaced relation above said heat conducting ducts.

* * * * *